United States Patent
O'Heir

[19]

[11] Patent Number: 5,864,333
[45] Date of Patent: *Jan. 26, 1999

[54] FOOT FORCE ACTUATED COMPUTER INPUT APPARATUS AND METHOD

[76] Inventor: Brian S. O'Heir, 61358 Eena Ct., Bend, Oreg. 97702

[ * ] Notice: This patent issued on a continued prosecution application filed under 37 CFR 1.53(d), and is subject to the twenty year patent term provisions of 35 U.S.C. 154(a)(2).

[21] Appl. No.: 606,855
[22] Filed: Feb. 26, 1996
[51] Int. Cl.[6] ............................. G06F 3/033; A63C 17/12
[52] U.S. Cl. ............................................. 345/157; 180/181
[58] Field of Search .................................. 345/163, 156, 345/157; 463/36; 180/180, 181, 6.5

[56] References Cited

U.S. PATENT DOCUMENTS

| | | | |
|---|---|---|---|
| 3,702,999 | 11/1972 | Gradisar | 340/573 |
| 4,809,117 | 2/1989 | Friedman | 360/137 |
| 5,049,079 | 9/1991 | Furtado et al. | 434/253 |
| 5,148,152 | 9/1992 | Stueckle et al. | 345/156 |
| 5,230,623 | 7/1993 | Guthrie et al. | 345/163 |
| 5,245,320 | 9/1993 | Bouton | 345/167 |
| 5,367,315 | 11/1994 | Pan | 345/156 |
| 5,487,441 | 1/1996 | Endo et al. | 180/181 |
| 5,511,561 | 4/1996 | Wanderman et al. | 128/779 |
| 5,524,637 | 6/1996 | Erickson | 600/592 |
| 5,552,807 | 9/1996 | Hayes et al. | 345/156 |
| 5,577,981 | 11/1996 | Jarvik | 482/4 |
| 5,592,401 | 1/1997 | Kramer | 364/550 |
| 5,694,152 | 12/1997 | Loop | 345/157 |
| 5,701,965 | 12/1997 | Kamen et al. | 180/7.1 |

*Primary Examiner*—Jeffery Brier

[57] ABSTRACT

Apparatus and method are disclosed for generating control signals for manipulating viewpoints and other objects of a computer generated virtual three dimensional space according to forces exerted by the feet of the user. The apparatus includes shoes, or pads, used beneath the user's feet containing sensors and circuitry for detecting force balances within and between the feet. Force balance signals are input to the computer system and used for generating program control data thereto. The control data are used as thrust and torque vectors for manipulating the location of the viewpoint, and orientation of the view within the virtual space. By intermixing the assignment of force balance signals to thrust or torque vectors various methods are derived for operating the apparatus to navigate the virtual space. The invention also functions as a man-machine interface for vehicular control and other machine control based on a user's exerted foot force or weight balance.

20 Claims, 9 Drawing Sheets

Fig. 6-a

```
20 X = 1026: Y=256: REM X = MAX READING; +5 VOLTS
REM LINES 30 - 65 READ SENSORS FOR LEFT SHOE
REM DBY 41 = 1-4 SELECTS A/D CHANNEL
REM CALL 38 RUNS A/D ASSEMBLY ROUTINE
REM A/D RESULTS STORED IN 42 & 43
30 DBY 41=1: CALL 38
35 P= X -((DBY 42)+(Y*(DBY 43)))
40 DBY 41=2: CALL 38
45 Q=X-((DBY 42)+(Y*(DBY 43)))
50 DBY 41=3: CALL 38
55 R= X-((DBY 42)+(Y*(DBY 43)))
60 DBY 41=4: CALL 38
65 S= X-((DBY 42)+(Y*(DBY 43)))
REM LEFT SHOE SENSOR READINGS ARE COLLATED FOR:
REM TOE (A), HEEL (B), LEFT (C), RIGHT (D)
70 A=P+Q : B=R+S : C=P+R : D=Q+S
REM LINES 75 - 90 NO COLLATED READINGS < 1 OR > 1026
75 IF A<1 THEN A=1: IF A>X THEN A=X
80 IF B<1 THEN B=1: IF B>X THEN B=X
85 IF C<1 THEN C=1: IF C>X THEN C=X
90 IF D<1 THEN D=1: IF D>X THEN D=X
REM LINES 100 - 115 CALCULATE FORCE
REM DISTRIBUTIONS FOR TOE/HEEL AND
REM LEFT/RIGHT WITHIN LEFT SHOE
100 IF A>B THEN J=A/B: GOTO 110
105 J=(B/A)* -1
110 IF C>D THEN L=C/D: GOTO 120
115 L=(D/C)* -1
REM LINES 120 - 155 READ SENSORS FOR RIGHT SHOE
REM DBY 41 = 5-0 SELECTS A/D CHANNEL
REM CALL 38 RUNS A/D ASSEMBLY ROUTINE
REM A/D RESULTS STORED IN 42 & 43
120 DBY 41=5: CALL 38
125 P= X-((DBY 42)+(Y*(DBY 43)))
130 DBY 41=6: CALL 38
135 Q= X-((DBY 42)+(Y*(DBY 43)))
140 DBY 41=7: CALL 38
145 R= X-((DBY 42)+(Y*(DBY 43)))
150 DBY 41=0: CALL 38
```

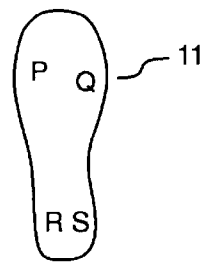
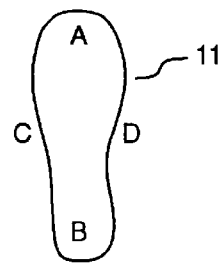
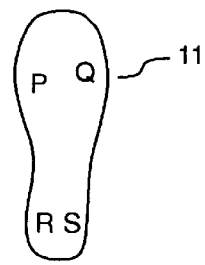

Fig. 6-b

```
155 S= X-((DBY 42)+(Y*(DBY 43)))
REM RIGHT SHOE SENSOR READINGS ARE COLLATED FOR:
REM TOE (E), HEEL (F), LEFT (G), RIGHT (H)
160 E=P+Q : F=R+S : G=P+R : H=Q+S
REM LINES 165 - 185 NO COLLATED READINGS < 1 OR > 1026
165 IF E<1 THEN E=1: IF E>X THEN E=X
170 IF F<1 THEN F=1: IF F>X THEN F=X
180 IF G<1 THEN G=1: IF G>X THEN G=X
185 IF H<1 THEN H=1: IF H>X THEN H=X
REM LINES 190 - 205 CALCULATE FORCE
REM DISTRIBUTIONS FOR TOE/HEEL AND
REM LEFT/RIGHT WITHIN RIGHT SHOE
190 IF E>F THEN K=E/F: GOTO 200
195 K=(F/E)* -1
200 IF G>H THEN M=G/H: GOTO 210
205 M=(H/G)* -1
REM EACH SHOE SENSOR READINGS ARE COLLATED FOR:
REM LEFT SHOE (N), RIGHT SHOE (O)
210 N=A+B : O=E+F: I=0
REM IF LEFT SHOE (N) IS OFF GROUND I=5000
220 IF N<100 THEN I=5000
REM IF RIGHT SHOE (O) IS OFF GROUND I=10000
REM IF BOTH SHOES ARE OFF THE GROUND I=15000
230 IF O<100 THEN I=I+10000
240 IF I>0 THEN GOTO 260
REM LINES 250 - 255 CALCULATE FORCE
REM DISTRIBUTIONS BETWEEN SHOES
250 IF N>O THEN I=N/O: GOTO 260
255 I=(O/N)* -1
REM LINE 260 OUTPUTS CONTINUOUS COMMA
REM DELIMITED DATA STREAM VIA SERIAL PORT
260 PRINT J;",";L;",";K;",";M;",";I;";";
270 GOTO 30
REM PRINTS J, L, K, M, I
REM J=LEFT TOE/HEEL, L=LEFT LEFT/RIGHT : LEFT SHOE
REM K=RIGHT TOE/HEEL, M=RIGHT LEFT/RIGHT: RIGHT SHOE
REM I=LEFT SHOE/RIGHT SHOE : BETWEEN SHOES
```

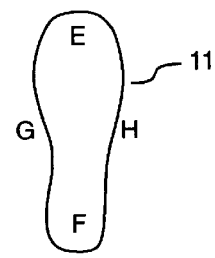

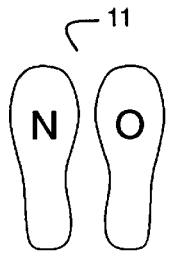

FOOT FORCE ACTUATED COMPUTER INPUT APPARATUS AND METHOD

BACKGROUND—FIELD OF INVENTION

This invention relates to information handling systems, specifically to the control of computer display information such as cursors, pointers, graphic objects, and viewpoints of three dimensional virtual environments, or virtual space, based on forces exerted by the feet of the user.

BACKGROUND—DESCRIPTION OF PRIOR ART

Head mounted displays and head tracking devices make possible an immersible interaction with virtual space. With this interaction the image changes as the user's location and orientation change. This has become known as Virtual Reality. Virtual reality applications for science, industry, education, and entertainment will require natural and intuitive navigational means.

Existing navigation devices consist of the following: keyboards, mice, rotational mice, space control mice, joysticks, 3D joysticks, trackballs, trackpads, head trackers, force converters, and data gloves. Only space control mice, 3D joysticks, head trackers, force converters, and data gloves are designed for three dimensional navigation and positioning. With the exception of head trackers, all of the devices are controlled with a hand.

The data glove type input device has proven superior in navigating virtual space. U.S. Pat. No. 4,988,981, filed Feb. 28, 1989 by T. Zimmerman and J. Lanier and entitled "Computer Data Entry And Manipulation Apparatus And Method" describes this input device. The Zimmerman device consists of a glove containing digit flexure sensors and an ultrasonic position sensing system. Together they generate a virtual hand accurate in it's location, orientation, and gesture. Gestures are used to navigate. The user's viewpoint is moved in the direction the index finger points. Macro movement is controlled by flexing the thumb. Micro movement is controlled by flexing the smaller digits. Despite it's simple methods the data glove has several drawbacks as a navigation device. Most notably, the user's hand is dedicated to movement. The user is unable to carry objects or perform tasks while moving. It is confusing, and uncomfortable. The unnatural, and repetitive, actions are counter-intuitive.

U.S. Pat. No. 5,452,615, filed Jul. 22, 1993 by John A. Hamilton and entitled "Force and Torque Converter" is a three dimensional input device. It senses force and torque applied by the user's hand to the device. This data is then used to transform computer generated objects and images. While effective in some situations the force and torque converter is limited because of it's hand operation. It presents problems similar to those associated with the data glove.

Hand operation makes most virtual space navigation devices inherently unnatural, awkward, and uncomfortable. Using a hand is simply not a natural or effective way to control locomotion.

OBJECTS AND ADVANTAGES

This invention generates control data based on forces exerted by the user's feet. The data is used to alter the location and orientation of a viewpoint of computer generated three dimensional virtual space. Foot pad sensors detect force biases within and between the user's feet. These force biases are used to generate control signals. The control signals are used to navigate virtual space.

Neural and muscular predisposition control pedestrian locomotion. From walking and running, to surfing and skiing, feet are the natural means for locomotion control. Hands are better suited for grasping and manipulating objects. Using the feet to navigate virtual space frees the hands for other activities. It permits more involved interaction with the program since activities are distributed among different and more suitable areas of the body and brain. Controlled by the user's feet, this invention provides an easy to use, natural, and intuitive means to navigate computer generated virtual spaces.

This device also provides an operational interface for a motor powered vehicle. Velocity and direction are controlled using the weight shift of an operator.

Additional objects and advantages are apparent from consideration of the following description with reference to the accompanying drawings.

DRAWING FIGURES

Figure 5:
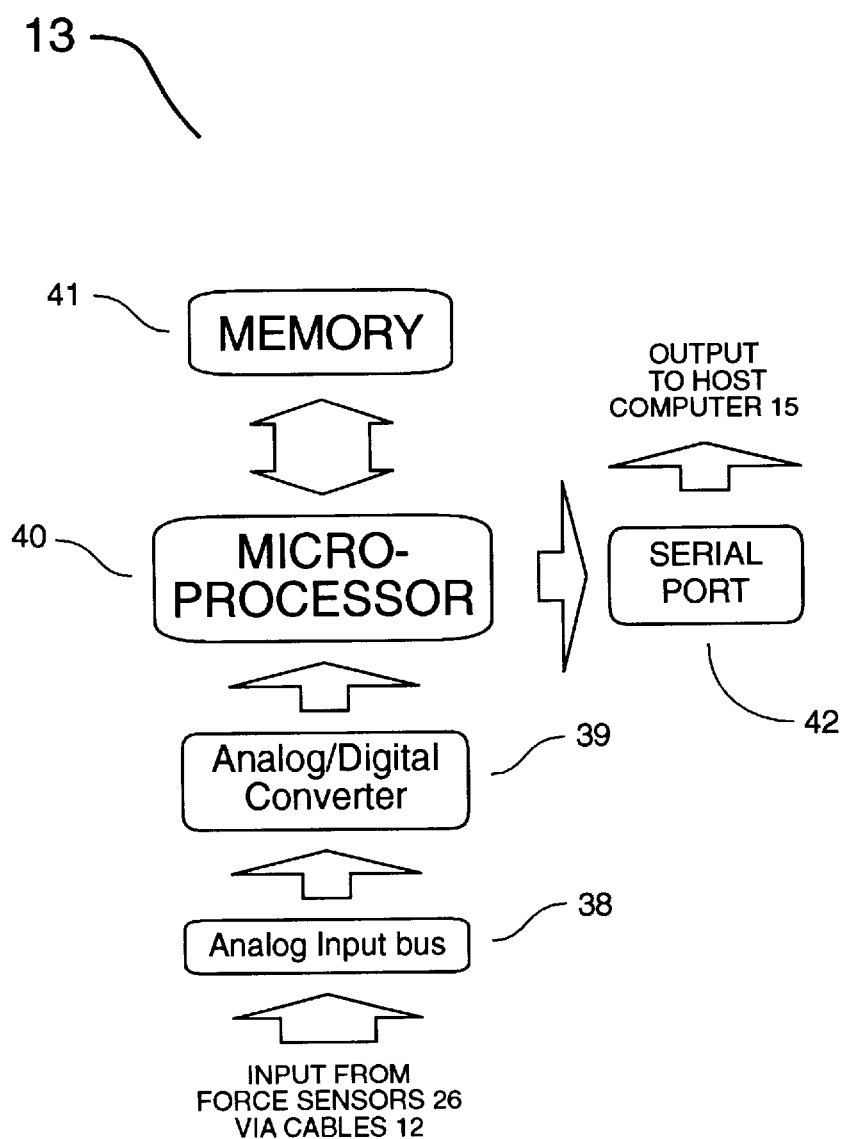
Figure 7:
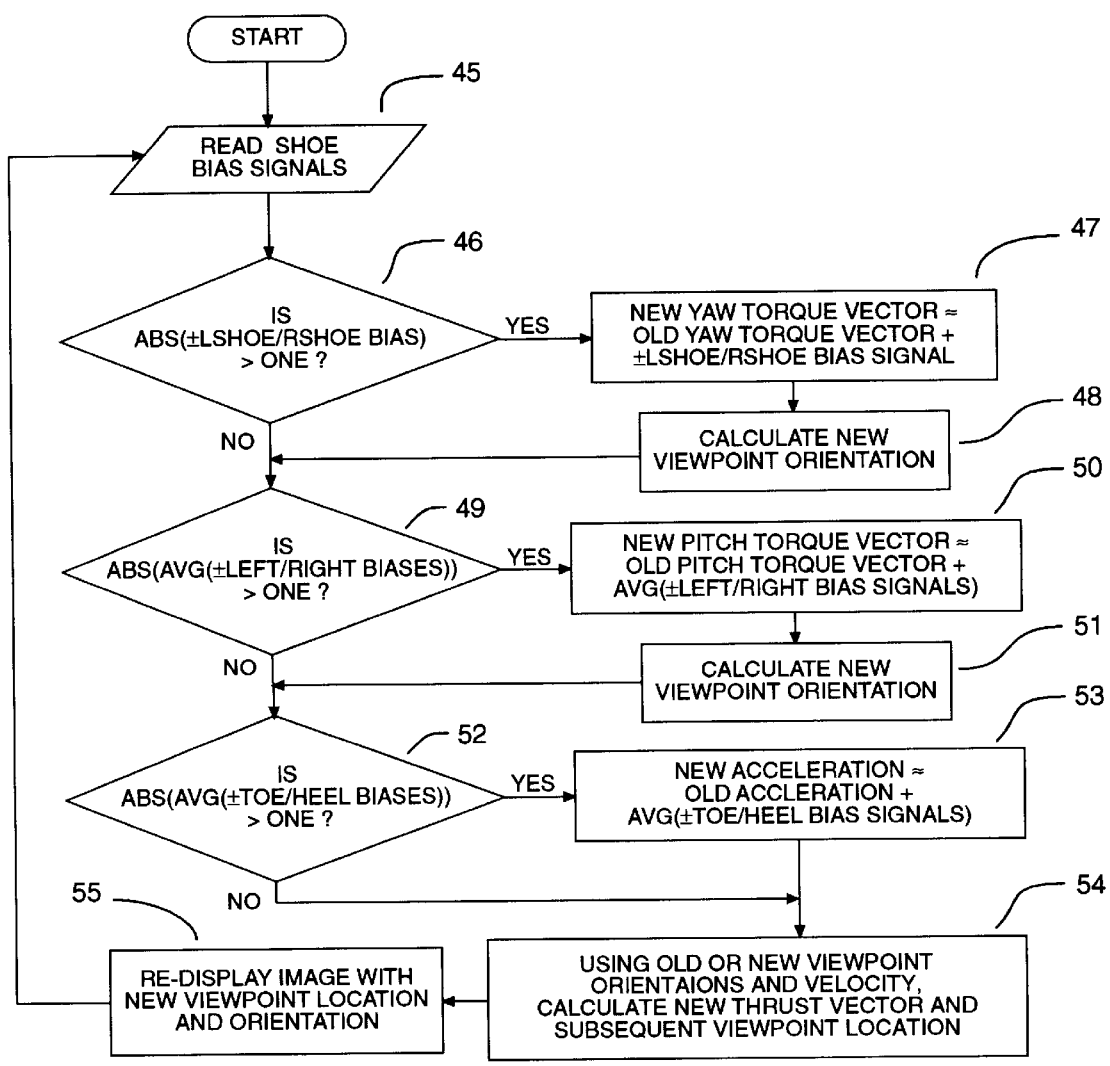
Figure 8:
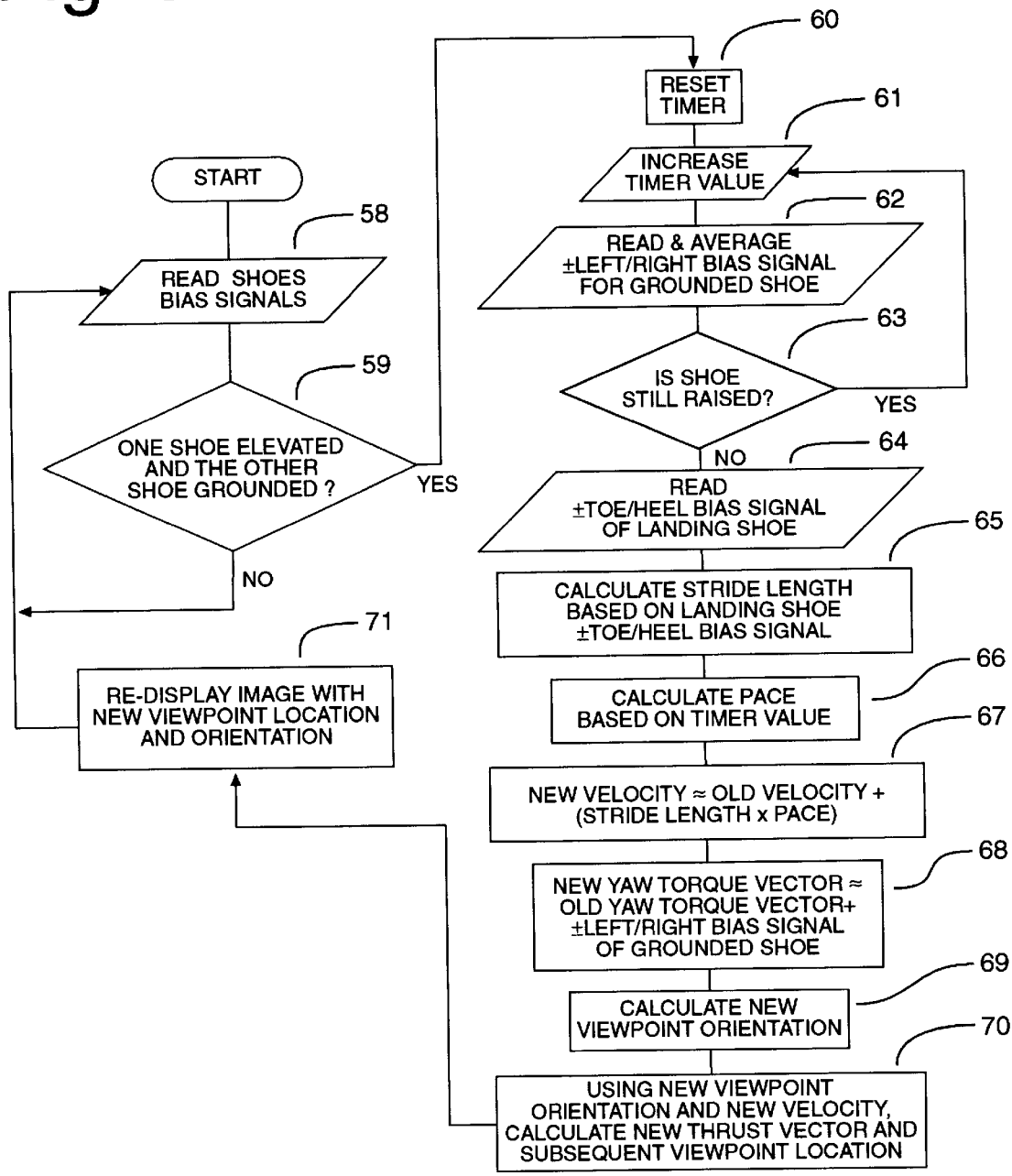
Figure 9:
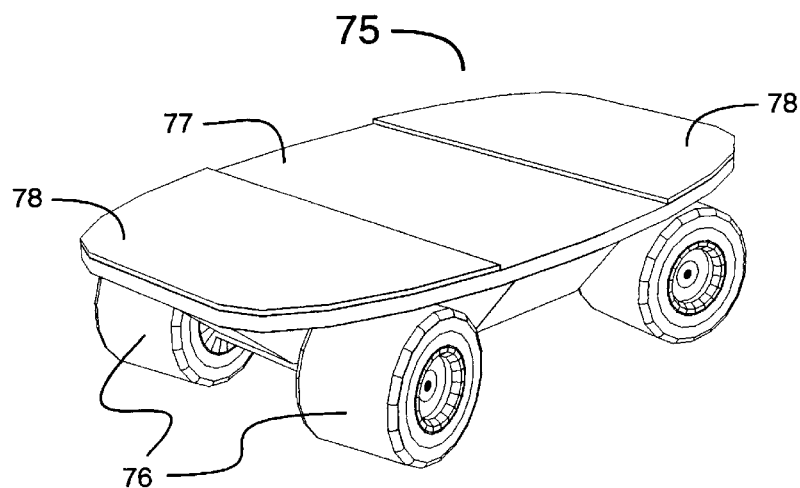
Figure 10:
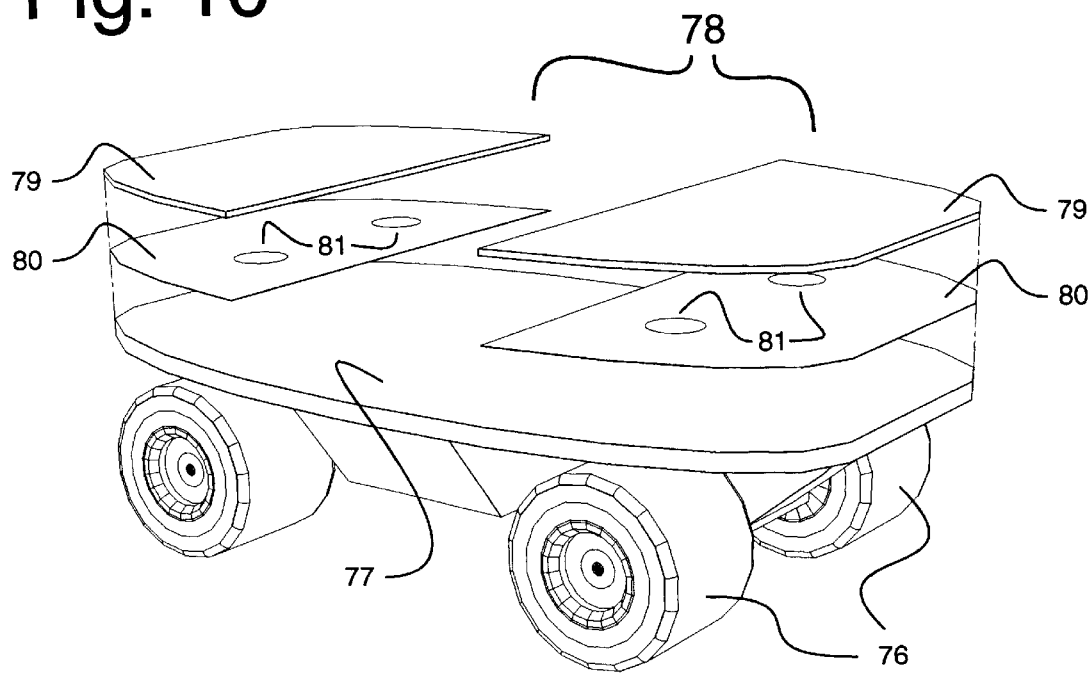

FIG. 5 is a block diagram of a preferred embodiment of processing circuit 13, used to connect shoe assemblies 11 to a host computer 15;

FIGS. 6-a & 6-b is a preferred embodiment of 80C52 Tiny BASIC source code for controlling processing circuit 13;

FIG. 7 is a flowchart of software employed to navigate a virtual space using a sliding mode;

FIG. 8 is a flowchart of software employed to navigate a virtual space using a walking mode;

FIG. 9 is a motor powered vehicle 75, utilizing an alternate embodiment of the invention as an operational interface;

FIG. 10 is an exploded view of foot pads 78 of motor powered vehicle 75 shown in FIG. 9.

SUMMARY

This invention utilizes force and position sensitive foot pads, and associated circuitry, to detect five (5) biases between sets of forces within and between the feet of the user. These biases are: the proportion of force exerted by the right foot versus the left (1); the proportion of force exerted along the longitudinal arch, or, the toe versus the heel of each foot (2); and the proportion of force exerted along the transverse arch, or, the right side versus the left side of each foot (2).

Electrical signals proportional to the force intensities at the toe, heel, left side, and right side of each foot pad are digitized, collated, and converted to the above mentioned force bias data. The data are input to the computer and used by software drivers to control graphic programs containing three dimensional environments, or virtual space.

The apparatus' force bias data are used as thrust vectors to alter the location of a viewpoint, or torque vectors to alter the orientation of a viewpoint. The association of the force bias data as thrust vectors, or torque vectors can be mixed and matched in various ways to facilitate numerous methods, or operating modes, for using the apparatus to navigate virtual space. Four preferred operating modes are briefly described below. These are further detailed later in the operation section.

1. FORWARD. The forward mode produces a sliding movement of the image in the direction the user's feet point, similar to skiing. Velocity is controlled by shifting force between the toes and heels of the feet. Left/right turning is controlled by shifting force between one foot or the other. The view turns in the direction of the force shift. Up/down turning is controlled by shifting force between the right or left side of each foot.

2. LATERAL. The lateral mode produces a sliding movement of the image toward one side of the user's feet, similar to surfing. Velocity is controlled by shifting force toward the foot in the direction the user wants to move. Left/right turning is controlled by shifting force toward the toes or heels of each foot. The view turns in the direction of the force shift. Up/down turning is controlled the same as in the FORWARD mode (1) above.

3. WALKING. The walking mode produces a simulated walking movement of the image. Velocity is based on the product of the length of the stride and the pace of the walk. Turning is controlled by applying force to the side of the grounded foot the user wants to turn toward.

4. RUNNING. The running mode produces a simulated running movement of the image. This is similar to the walking mode except faster. As with the walking mode, velocity is based on the product of the length of the stride and the pace of the run. Turning is controlled by applying force to the side of the grounded foot the user wants to turn toward.

Preferred Embodiment Description

FIGS. 1 through 8 of the drawings depict the preferred embodiment of the invention for purposes of illustration only. Alternative embodiments of the structures and methods illustrated herein may be employed without departing from the invention.

Figure 1:
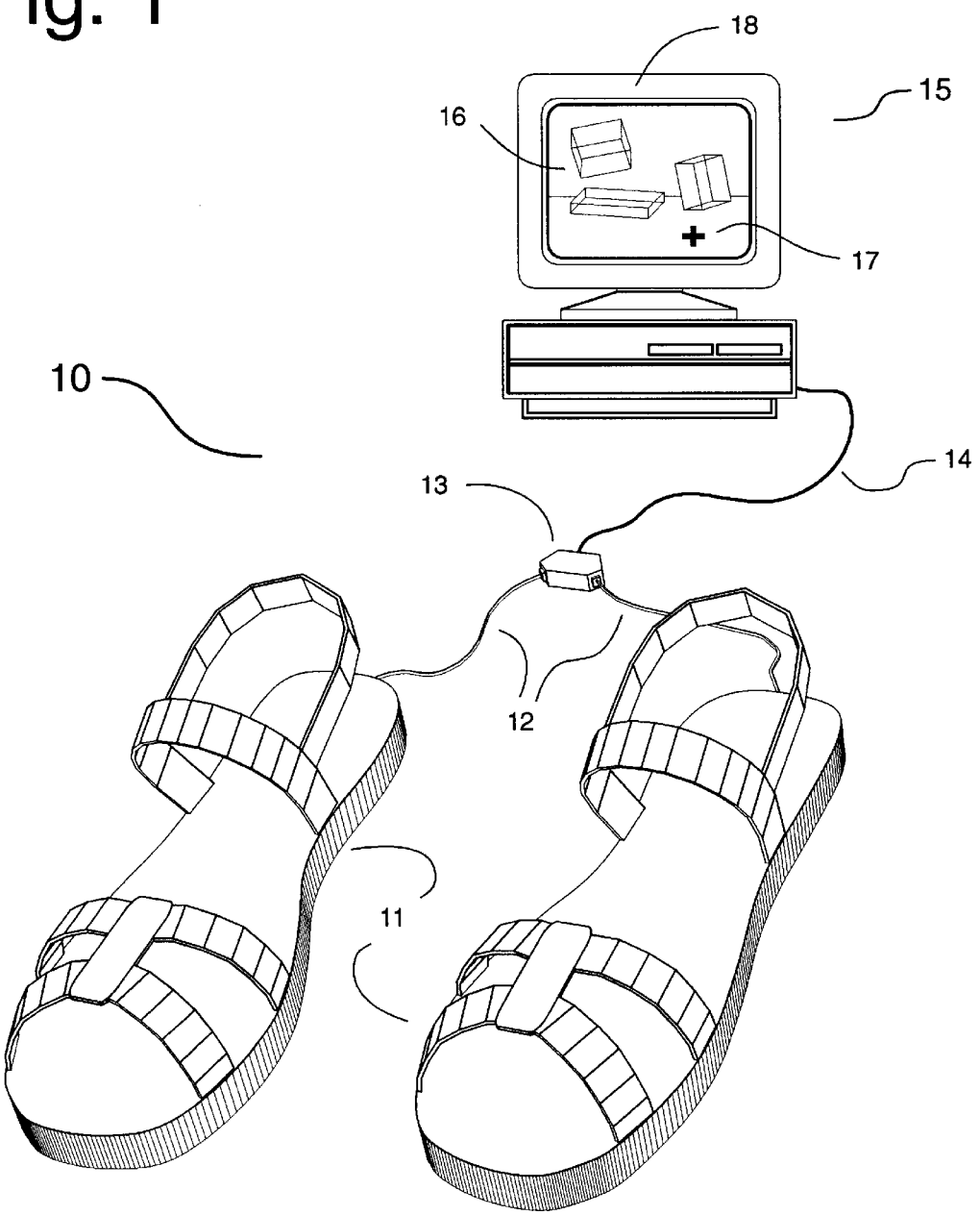
FIG. 1 is a perspective view of a preferred embodiment of the foot force actuated computer input apparatus 10 of the invention.

FIG. 1. is a perspective view illustrating the preferred embodiment of the present invention in it's intended mode of use, namely as a foot force actuated computer input apparatus 10. The apparatus 10 includes two shoe assemblies 11. These are coupled via conductive cables 12 to a processing circuit 13. The processing circuit is, in turn, connected via an interface cable 14 to a standard serial port of a host computer 15.

As explained below, shoe assemblies 11 contain sensors for detecting forces applied by the user's feet. In operation the user wears shoe assemblies 11. The shoe assemblies 11 are used while standing or sitting. The shoe assemblies 11 translate forces applied by the feet of the user into electrical control signals. These signals alter the viewpoint of a three dimensional image 16, and/or the position of a cursor 17, presented on a display screen 18 of host computer 15.

Signals generated from forces applied by the user's feet are transmitted first to processing circuit 13 by conductive cables 12. Other well known techniques such as radio or infrared could also be used. After manipulation by processing circuit 13, explained below, the signals are transmitted to host computer 15 via interface cable 14. Processing circuit 13 could also be housed within the case of host computer 15. Software directs host computer 15 to redraw three dimensional image 16, and/or cursor 17, according to signals transmitted from processing circuit 13. As examples, FIG. 7 and FIG. 8 are flow charts of enabling software, explained below, for two preferred methods of using the foot force actuated computer input apparatus 10.

Figure 2:
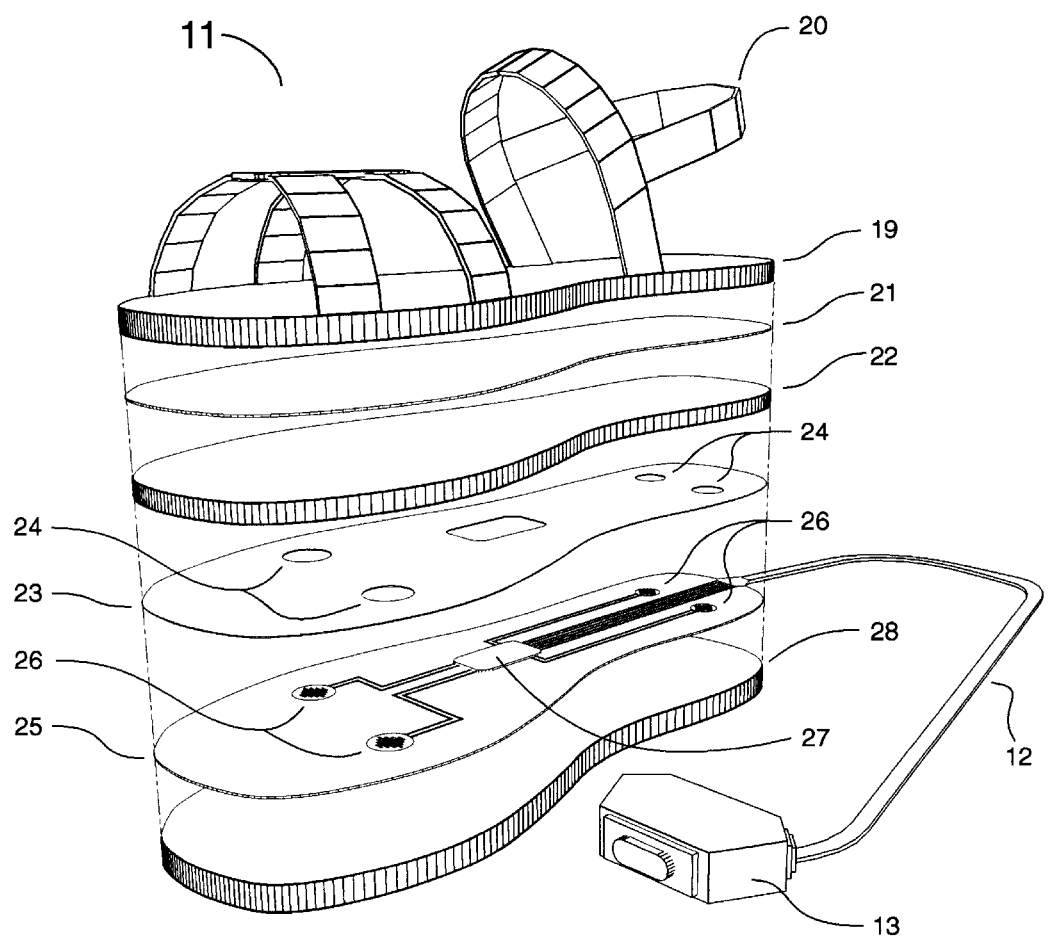
FIG. 2 is an exploded perspective view of one shoe assembly 11 shown in FIG. 1.

FIG. 2 is an exploded perspective view illustrating the preferred embodiment of one shoe assembly 11 as shown in FIG. 1. Shoe assembly 11 consists of parts 19, 21, 22, 23, 25, and 28 laminated together. Top sole 19, composed of closed cell neoprene rubber, secures the shoe assembly 11 to the user's foot with straps 20. Top sole 19 is bonded to force dispersion layer 21, a semi rigid plastic material. Bonded below force dispersion layer 21 is mid sole 22, also composed of closed cell neoprene rubber. Bonded below mid sole 22 is spacer layer 23, a thin, flexible plastic material with cutouts 24 for force sensors 26, and circuit 27, contained on sensor layer 25. Sensor layer 25, explained below, is bonded between spacer layer 23 and bottom sole 28, also composed of closed cell neoprene rubber. The areas of sensor layer 25 exposed to mid sole 22 by cutouts 24 on spacer layer 23 are not bonded to mid sole 22. Each shoe assembly 11 is coupled via conductive cable 12 to processing circuit 13, explained below.

Figure 3:
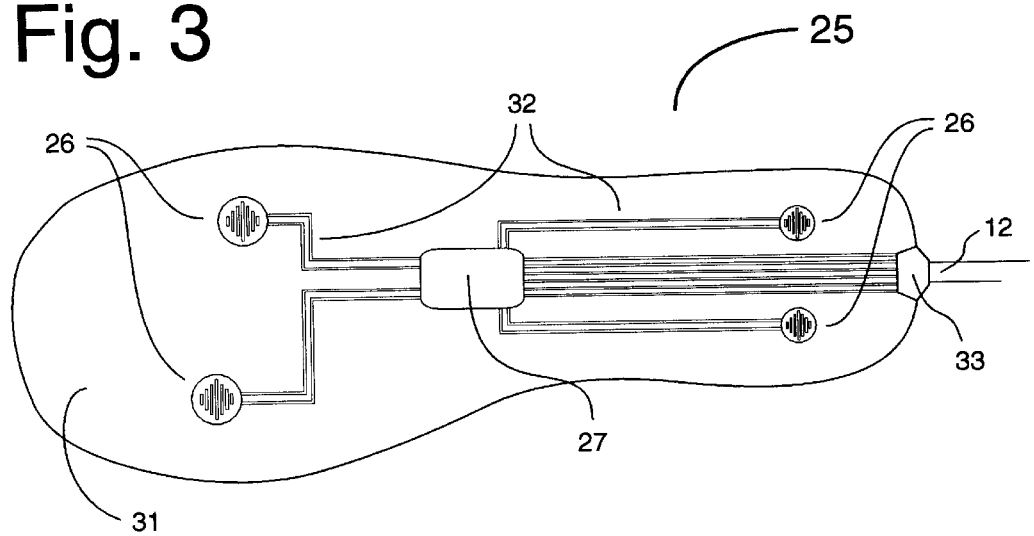
FIG. 3 is a top view of sensor layer 25 included in shoe assembly 11 shown in FIG. 2.

FIG. 3 is a top view illustrating sensor layer 25 of shoe assembly 11. Sensor layer 25 consists of flexible printed circuit board 31. The sensor layer contains four force sensors 26, electronic circuit 27, and conductive traces 32. The conductive traces connect the force sensors 26 to circuit 27, and circuit 27 to interface cable 12 via connector 33. Force sensors 26 are located such that foot force is exerted upon them by the tissue supporting the distal head of the first and fifth metatarsal bones in the anterior of each foot, and tissue supporting either side of the calcaneus bone in the posterior of each foot.

The force sensors 26 are preferably of the type that will provide a signal that is an analog representation of the amount of force exerted. In the illustrated embodiment the force sensors 26 are a variable resistance film type known as FSR™ Devices, available from Interlink Electronics, Inc. Other well known transducers such as strain gauges, pressure gauges, and load cells, might also be employed in alternative embodiments.

Figure 4:
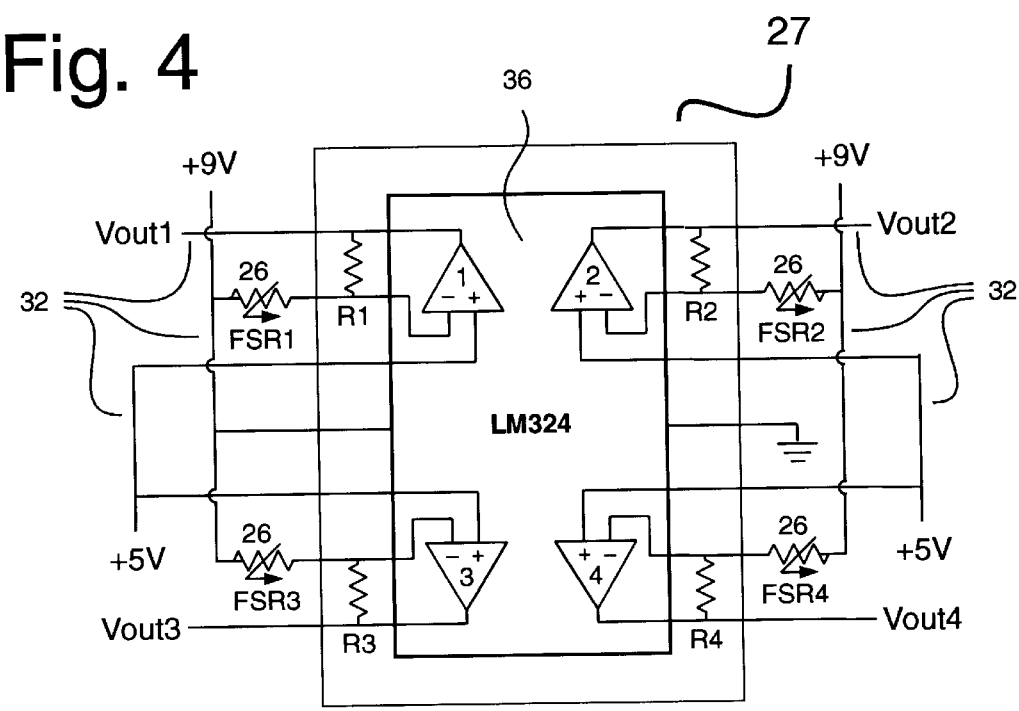
FIG. 4 is a circuit schematic of a preferred embodiment of the circuitry on sensor layer 25 shown in FIG. 3.

FIG. 4 is a schematic illustrating the complete circuitry present on sensor layer 25 of each shoe assembly 11. The complete circuit contains four FSR™ Device force sensors 26, FSR1, FSR2, FSR3, and FSR4; conductive traces 32 for power supply and output signals and circuit 27. Circuit 27 containing resistors R1, R2, R3, and R4, and LM324 quad OP amp 36 is a current-to-voltage converter for each force sensor 26 located on sensor layer 25. This circuit generates voltage signals which are inversely proportional to the force exerted on the force sensors 26.

FIG. 5 is a block diagram of processing circuit 13. Processing circuit 13 is a microcontroller device consisting of Analog Input Bus 38, Analog/Digital Converter 39, Microprocessor 40, Memory 41, and Serial Port 42. Processing circuit 13 calculates the toe/heel, left/right and leftfoot/rightfoot force bias data to be input to host computer 15. Voltage signals from force sensors 26 enter processing circuit 13 via cables 12 at analog input bus 38. These signals are sequentially digitized by Analog/Digital Converter 39 with the voltage data stored, via Microprocessor 40, in Memory 41. Then, using the voltage data, and BASIC code stored in Memory 41, and explained below, Microprocessor 40 calculates the force bias data. The resulting force bias data is then output via Serial Port 42 to host computer 15.

FIGS. 6a–6b contain a preferred embodiment of the 80C52 Tiny BASIC operating code for microprocessor 40 contained in processing circuit 13. In the code lines 30–65 write force sensor data from left shoe assembly 11 to variables P, Q, R, and S. Line 70 collates and rewrites this data to variables for the toe A, heel B, right side C, and left side D of left shoe assembly 11. Lines 75–90 restrict variables A, B, C, and D to values representative of voltages greater than 0 volts (>0) and not greater than 5 volts (<1026). Lines 100–115 calculate the magnitude and direction of the force biases between the toe/heel (100–105), and right/left (110–115) within the left shoe, and write this data to variables J and L. Lines 120–205 repeat the preceding writing, collating, and force bias calculation operations for right shoe assembly 11. Line 210 collates the sensor data for left shoe N and right shoe O assemblies 11. Lines 220–255 calculate the magnitude and direction of the force bias between both shoes, and write this to variable I, with lines 220 and 230 calculating whether one or both shoes are completely off the ground. Lastly, the force bias data for left toe/heel J, left left/right L, right toe/heel K, right left/right M, and leftshoe/rightshoe I is output in line 230 to serial port 42 in a comma delimited stream. Line 240 loops the process forever, sending data to host computer 15 continuously.

Preferred Embodiment Operation

This invention generates control data enabling a user to change the location and orientation of a viewpoint of a computer generated three dimensional environment, or virtual space. It enables the user to navigate the virtual space. In this sense, the invention is a virtual space transportation device.

Complete maneuverability within three dimensions requires control of all six (6) degrees of freedom. This involves the X, Y, and Z axis (3) coordinate components of translation; thrust vectors, and the roll, pitch, and yaw (3) components of rotation; torque vectors. A thrust vector generates an accelerating linear change of the user's viewpoint location in a particular direction. A torque vector generates an accelerating rotational change of the user's viewpoint orientation about an axis extending through the viewpoint. The invention is a relative device. That is, the changes in the viewpoint location and viewpoint orientation it causes are relative to an initial location and orientation. These changes are also complementary to any other changes on the viewpoint caused by head tracking and orientation devices. For example, if the invention rotates the viewpoint orientation 10 degrees to the right and the user (with head tracking) rotates their head 20 degrees also to the right the viewpoint orientation will rotate 10+20=30 degrees to the right.

As stated previously, the invention translates various force biases exerted by the feet of a user into control data for controlling three dimensional or virtual space graphics programs. Specifically, these force biases consist of those existing along the arch created by the feet, legs, and pelvis; and along the longitudinal arch (front/rear) and the transverse arch (left/right) of each foot. Typically, the control data generated from these force biases represents either thrust or torque vectors. The vectors alter the location and orientation of the viewpoint of the virtual space. By matching the force bias data derived from the apparatus to either thrust or torque vectors numerous methods or operating modes can be derived for navigating the virtual space. Four preferred operating modes are described below:

1. FORWARD. Using the forward mode produces a sliding translation of the image's viewpoint location in the direction the user's feet point (regardless of the direction the user's head points). The action is similar to skiing. Forward acceleration, the thrust vector responsible for translating the viewpoint, is produced by shifting force toward the toes of the feet, generating an increasingly positive toe/heel force bias signal. Coasting, deceleration, stopping, and reverse movement are produced by shifting force toward the heels of the feet, generating a decreasingly positive, and subsequently negative, toe/heel force bias signal. Turning left or right, a torque vector, is accomplished by shifting force from one foot to the other, with the viewpoint orientation rotating in the direction of the force shift. Shifting to the left foot generates a positive leftfoot/rightfoot force bias signal and rotates the view left. Shifting to the right foot generates a negative leftfoot/rightfoot force bias signal and rotates the view right. Turning up or down, also a torque vector, is accomplished by rolling the feet toward the right or left side. Rolling to the right generates a negative left/right signal and rotates the viewpoint orientation upward. Rolling to the left generates a positive left/right signal and rotates the viewpoint orientation downward. The rate of any translation or rotation is proportional to the intensity of the force applied.

FIG. 7 is a flowchart of software employed to navigate a virtual space using the above described FORWARD mode. Assume the invention is being used to navigate through a virtual space. The basic force bias data is continuously being updated within host computer 15, ready for reading on an event driven basis as shown by block 45. The leftshoe/rightshoe force bias data is checked in block 46. If the value is greater than one (1) a new yaw torque vector is calculated in block 47 and a new yaw viewpoint orientation is calculated in block 48. The absolute value of the average of the left/right force bias data of both shoes is checked in block 49. If the value is greater than one (1) a new pitch torque vector is calculated in block 50 and a new pitch viewpoint orientation is calculated in block 51. The absolute value of the average of the toe/heel force bias data of both shoes is checked in block 52. If it is greater than one (1) a new acceleration is calculated in block 53. In block 54 a new thrust vector is calculated from new or previous yaw and pitch viewpoint orientations and a new or previous acceleration. Using this thrust vector a new viewpoint location is calculated. Block 55 redraws the three dimensional image with the new location and orientation, and the software loops back to block 45.

2. LATERAL. Using the lateral mode produces a sliding translation of the image's viewpoint location toward one side of the user's feet (regardless of the direction the user's head points). The action is similar to surfing. Lateral acceleration, the thrust vector responsible for translating the viewpoint, is produced by shifting force toward the foot in the direction the user wants to move. Coasting, deceleration, stopping, and reverse movement are produced by shifting force toward the opposite foot. Shifting to the left foot generates a positive leftfoot/rightfoot force bias signal, and shifting to the right foot generates a negative leftfoot/rightfoot force bias signal. Turning left or right, a torque vector, is accomplished by shifting force toward the toes or heels of each foot. The viewpoint orientation rotates in the direction of the force shift. Shifting force toward the toes of the feet generates a positive toe/heel force bias signal, rotating the viewpoint orientation in the direction of the toes. Shifting force toward the heels of the feet generates a negative toe/heel force bias signal, rotating the viewpoint orientation in the direction of the heels. Turning up or down is accomplished the same as in the FORWARD mode (1) above.

3. WALKING. Using the walking mode produces a simulated walking translation of the image's viewpoint location in the direction the user's feet point (regardless of the direction the user's head points). The walking mode is recognized by repeatedly raising alternate feet off the ground while at least one foot is grounded, e.g. left off, both on, right off, etc. Therefore, simply walking in place, or on a treadmill, engages the walking mode. The velocity of this image viewpoint translation is based on the product of the length of the stride and the pace of the walk. The length of the stride is inversely proportional to the toe/heel force force bias exhibited when the elevated shoe returns to the ground. The stride length increases as more force is exerted on the heel. The pace is inversely proportional to the time the shoe is elevated, i.e., the pace quickens as the elevated time period decreases. Turning is produced by applying force to the side of the grounded foot the user wants to turn toward. The degree of rotation, for each step, is proportional to the average of the left/right force bias signals produced by the grounded shoe.

FIG. 8 is a flowchart of software employed to navigate a virtual space using the above described WALKING mode. Assume the invention is being used to navigate through a virtual space. The basic force bias data is continuously being updated within host computer 15, ready for reading on an event driven basis as shown by block 58. The leftshoe/rightshoe force bias data is checked in block 59. If the value indicates one shoe is elevated and the other is grounded control passes to block 60, resetting the timer. In blocks 61, 62, and 63 control loops until the elevated shoe returns to the ground. While the shoe is elevated the timer value increments larger in block 61 and the ±left/right force bias signal of the grounded shoe is read and averaged in block 62. When the elevated shoe returns to the ground control proceeds to block 64 where the ±toe/heel force bias signal is read. Block 65 then calculates the stride length based on the ±toe/heel force bias signal obtained in block 64. Using the timer value from block 61, block 66 calculates the pace. Using the stride length and pace data, block 67 calculates a new velocity from the old velocity. Using the ±left/right force biases signal obtained in block 62, block 68 calculates a new yaw torque vector from the old yaw torque vector. In block 69 a new viewpoint orientation is calculated by modifying the old viewpoint orientation with the new yaw torque vector. In block 70 a thrust vector is calculated having the direction of the viewpoint orientation obtained in block 69 and velocity obtained in block 67. This thrust vector yields a new viewpoint location. Finally in block 71 the three dimensional image is redrawn with the new viewpoint orientation and location, and control loops back to block 58.

4. RUNNING. Using the running mode produces a simulated running translation of the image's viewpoint location in the direction the user's feet point, similar to the walking mode except faster. The running mode is recognized by repeatedly raising alternate feet off the ground while both feet are periodically off the ground, e.g. left off, both off, right off, etc. Therefore, simply running in place, or on a treadmill, engages the running mode. As with the walking mode the velocity of this image viewpoint translation is based on the product of the length of the stride and the pace of the run. As the user runs in place, the length of the stride is inversely proportional to the toe/heel force force bias exhibited when the elevated foot returns to the ground, i.e., the stride length increases as more force is exerted on the heel. The pace is inversely proportional to the time the foot is elevated, i.e., the pace quickens as the elevated time period decreases. Turning is produced by applying force to the side of the grounded foot the user wants to turn toward. The degree of rotation, for each step, is proportional to the average of the left/right force bias signals for both feet.

Forward, lateral, or any other sliding type mode can be modified by changing the assignments of thrust and torque vectors. For example, an action which produced a turn upward could be reassigned to produce an acceleration upward by changing the assignment of the control data for that action from a torque vector to a thrust vector.

Presented here are just a few of the possible methods or operating modes which can be derived from the 5 basic force bias signals, and the 2 grounded/elevated signals. Other modes can be developed for use with specialized equipment such as, stationary bicycles, downhill and x-country skiing trainers, skating simulations, and specialized vehicular control.

Alternate Embodiment Description

FIG. 9 is a perspective view illustrating a motor powered vehicle 75 utilizing an alternate embodiment of the present invention. Motor powered vehicle 75 is supported and transported by four rubber wheels 76. The wheels 76 are powered by an electric motor contained within chassis 77. Controlling power to wheels 76, controlling braking of wheels 76, and controlling steering of wheels 76, is facilitated with the invention via foot pads 78.

FIG. 10 is a perspective view of motor powered vehicle 75 illustrating an exploded view of foot pads 78. Each foot pad 78 is composed of closed cell neoprene rubber top pad 79, and sensor layer 80, bonded to chassis 77. Sensor layer 80, of each foot pad, contains two force sensors 81; the previously mentioned FSR™ Devices available from Interlink Electronics, Inc.

Alternate Embodiment Operation

This alternate embodiment of the present invention enables a user to control the velocity and direction of a motorized platform or "skateboard" in a natural manner simply by riding upon it in a standing position.

Acceleration and braking are controlled by leaning forward/backward; forward to accelerate and backward to brake. As the user leans forward applying additional force to the forward sensors to accelerate the vehicle their center of gravity moves forward. As the vehicle accelerates, their center of gravity is pushed back reducing force on the forward sensors and reducing the acceleration. As the user leans backward applying additional force to the rear sensors to brake the vehicle their center of gravity moves backward. As the vehicle decelerates, their center of gravity is pushed forward reducing force on the rear sensors and reducing the deceleration. The actions are self buffering and highly controllable. Steering is controlled by leaning left/right; turning in the direction of the lean.

Conclusion, Ramifications, and Scope

According to the above described system a novel and improved apparatus and method is provided for navigating virtual space, positioning virtual objects, controlling vehicles and machinery, and otherwise generating control data based on a user's exerted foot force or weight shift.

While the above description contains many specifics, these should not be construed as limitations on the scope of the invention, but rather as examples of preferred embodiments thereof. As previously mentioned, various other embodiments and ramifications are possible without departing from the scope of the invention. For example, the foot pads might be constructed with different force transducers, or the processing circuit to the host computer might contain different electronics, with a different connection to foot pads and/or host computer. The invention can be used with computer systems or with other non-computerized machinery. The full scope of the invention should not be determined from the examples given, but from the appended claims and their legal equivalents.

Abstract

Apparatus and method are disclosed for generating control signals for manipulating viewpoints and other objects of a computer generated virtual three dimensional space according to forces exerted by the feet of the user. The apparatus includes shoes, or pads, used beneath the user's feet containing sensors and circuitry for detecting force bias within and between the feet. Force bias signals are input to the computer system and used for generating program control data thereto. The control data are used as thrust and torque vectors for manipulating the location and orientation of the viewpoint within the virtual space. By intermixing the assignment of force bias signals to thrust or torque vectors various methods are derived for operating the apparatus to navigate the virtual space. The invention also functions as a man-machine interface for vehicular control and other machine control based on a user's exerted foot force or weight shift.

I claim:

1. Foot operated apparatus for controlling a computer graphics program comprising;
   display means for displaying a virtual three dimensional space;
   resilient force bias sensing means incorporated into the soles of ambulatory shoes;
   control signals output by said force bias sensing means corresponding to the direction and magnitude of force bias within at least one set of forces exerted by the feet of the operator upon said force bias sensing means;
   transmission means for transmitting the control signals to the computer; and
   program control means utilizing said control signals to change the location and orientation of objects within the virtual space, wherein the rate of change of said location and orientation corresponds to the magnitude of said force bias, and the direction of change of said location and orientation corresponds to the direction of said force bias.

2. Apparatus as in claim 1 wherein said display means includes a Head Mounted Display.

3. Apparatus as in claim 1 wherein said force bias sensing means is responsive to force exerted by the distal head of the first and fifth metatarsal bones in the anterior of each foot and force exerted by either side of the calcaneus bone in the posterior of each foot.

4. Apparatus as in claim 1 wherein said force bias sensing means generate control signals corresponding to force bias existing between the toe and heel of each foot, the left and right side of each foot, and the left and right foot.

5. Apparatus as in claim 1 wherein said transmission means contains a device selected from the group consisting of cables, electromagnetic transmitters/receivers and optical transmitters/receivers.

6. Apparatus as in claim 1 wherein said force bias sensing means generate control signals corresponding to either or both feet being elevated.

7. Apparatus as in claim 1 wherein said program control means changes the location of objects based on the amount of time either foot is elevated.

8. Apparatus as in claim 1 wherein said control signals are digital signals.

9. Apparatus as in claim 1 wherein said objects include virtual objects, viewpoints, and cursors.

10. Apparatus as in claim 1 wherein said force bias sensing means is a static pressure sensitive device.

11. A method of using an operator's ambulatory motion to control a computer graphics program comprising the steps of;
   (1) associating force bias within sets of forces exerted by the operator's feet during ambulatory motion to control signals corresponding to the direction and magnitude of said force bias, including control signals corresponding to either or both feet being elevated; and
   (2) associating said control signals to methods of program control for changing the location and orientation of objects within the computer graphics program in response to weight shifts produced during ambulatory motion by the operator, wherein the rate of change of said location and orientation corresponds to the magnitude of said force bias, and the direction of change of said location and orientation corresponds to the direction of said force bias.

12. Method as in claim 11 wherein said force bias include those existing between the toe and heel of each foot, and left and right foot.

13. Method as in claim 11 wherein said control signals are digital signals.

14. Method as in claim 11 wherein said force bias include those existing between the left and right side of each foot.

15. Method as in claim 11 wherein said program control means changes the location of objects based on the amount of time either foot is elevated.

16. Method as in claim 11 wherein said objects include virtual objects, viewpoints and cursors.

17. A motor powered wheeled vehicle comprising a planar platform adapted to carry a standing rider, said platform incorporating static force bias sensing means generating control signals corresponding to the direction and magnitude of force bias exerted by the feet of the operator between the toe and heel of each foot and the left and right foot, said platform fixedly carried from beneath by at least two wheels positioned front and rear, said wheels capable of propelling, braking and steering the vehicle and responsive to control signals from said force bias sensing means, wherein the rate of change in propulsion and braking corresponds to the magnitude of said force bias, and the direction of change in propulsion, braking and steering corresponds to the direction of said force bias.

18. Motor powered wheeled vehicle as in claim 17 wherein said force bias sensing means is a film type pressure sensitive device.

19. Motor powered wheeled vehicle as in claim 17 wherein the power is derived from an electric motor.

20. Motor powered wheeled vehicle as in claim 17 wherein said platform is carried by four wheels, positioned side by side in pairs, front and rear.

* * * * *